US005873101A

United States Patent [19]
Klein

[11] Patent Number: 5,873,101
[45] Date of Patent: Feb. 16, 1999

[54] DATABASE BACKUP/RESTORE AND BULK DATA TRANSFER

[75] Inventor: Jonathan D. Klein, Pleasanton, Calif.

[73] Assignee: Oracle Corporation, Redwood Shores, Calif.

[21] Appl. No.: 799,562

[22] Filed: Feb. 10, 1997

[51] Int. Cl.[6] .................................................. G06F 11/00
[52] U.S. Cl. .................... 707/204; 707/200; 707/201; 707/202; 395/182.04; 395/182.11; 395/182.18
[58] Field of Search ................... 707/202, 204, 707/201, 200; 395/182.04, 182.11, 182.18

[56] References Cited

U.S. PATENT DOCUMENTS

| | | | |
|---|---|---|---|
| 5,043,871 | 8/1991 | Nishigaki et al. ....................... 364/200 |
| 5,638,509 | 6/1997 | Dunphy et al. ..................... 395/182.18 |
| 5,673,382 | 9/1997 | Cannon et al. ..................... 395/182.04 |
| 5,720,026 | 2/1998 | Uemura et al. ..................... 395/182.04 |
| 5,754,782 | 5/1998 | Masada ............................... 395/200.43 |

*Primary Examiner*—Thomas G. Black
*Assistant Examiner*—Jean R. Homere
*Attorney, Agent, or Firm*—McDermott, Will & Emery

[57] ABSTRACT

A method and apparatus for backing up and restoring data to a database is provided. During the backup, data blocks are copied from a database to a storage medium without the contents of the data blocks being analyzed during the copy. Data indicating the initial configuration of the data blocks is also backed up. During the restore, the data blocks are copied from the storage medium back to the database. The information within each copied data block is analyzed to identify any location dependent information (e.g., pointers). All location dependent information is updated based on the initial configuration and the new configuration to cause the location dependent information to reflect the new configuration.

20 Claims, 5 Drawing Sheets

DATABASE BACKUP/RESTORE AND BULK DATA TRANSFER

FIELD OF THE INVENTION

The present invention relates to database systems, and more specifically, to a method and apparatus for providing database backup/restore and bulk data transfer.

BACKGROUND OF THE INVENTION

Two possible approaches for backing up and restoring a database include the "logical" approach and the "physical" approach. According to the logical approach, the backup of a database involves reading the data to be backed up from the database, converting the data from its native database representation to a user/application layer format, such as columns and rows, and then storing the user data in a backup file. To restore the data, the user data is read from the backup file, converted back into its native database format and written to disk. SQL (Structured Query Language) retrieve and insert calls are sometimes used to convert the data from native disk format to user format and from user format back to native database format.

By converting the database data from native database representation to a higher level user format, the logical approach supports the backup and restore of data between different types of databases, as well as bulk data transfer between databases. Converting the data into user format also provides the benefit of only backing up the actual data, without the internal database data structures associated with the data, thereby minimizing the amount of data which needs to be backed up and restored. However, despite the inherent flexibility offered by the logical approach, the physical-to-logical conversion of data during both the backup and restore can require large amounts of time and system resources.

In contrast to the logical approach, backing up a database according to the physical approach involves copying database data files from a database to a backup location without converting the data contained in the data files. The data is restored by copying the data files from the backup location back to the database. Sometimes an operating system call or other copy utility is used to copy the data files, making the physical approach much faster than the logical approach.

However, the physical approach also has its disadvantages. First, some database systems automatically allocate a minimum amount of data space regardless of whether all of the allocated space is used. Thus, some space that is physically used is logically unused. Since all of the allocated space is located in the system data files, backing up and restoring all of the data files for a database necessarily means that logically unused data blocks will be backed up and restored, wasting system resources and increasing the backup and restore time.

Perhaps the most important limitation associated with the physical approach is that data files may only be restored to a database system supporting the database file format of the original database. Moreover, even if files are to be restored to a compatible database, the data cannot be directly inserted into the database if that database already contains data.

In view of the advantages and disadvantages provided by the logical and physical approaches, an approach providing for the backup and restore of a database and the transfer of bulk data having the flexibility of the logical approach and the favorable performance characteristics of the physical approach is highly desirable.

SUMMARY OF THE INVENTION

The present invention provides a method and apparatus for backing up and restoring data. According to one aspect of the present invention, a method is provided for backing up and restoring a plurality of data blocks between a source and a destination. During the backup, the plurality of data blocks are first copied from the source to the destination without analyzing the contents of the plurality of data blocks. During the restore, the plurality of data blocks are copied from the destination back to the source and the contents of the plurality of data blocks are analyzed to identify any location dependent information. Any identified location dependent information is updated so that the location dependent information within the plurality of data blocks reflects the final configuration.

According to another aspect of the present invention, a method provides for backing up a plurality of data blocks from a database to a storage medium and then restoring the plurality of data blocks from the storage medium back to the database. During the backup, both the plurality of data blocks and a first address map are copied from the database to the storage medium without analyzing the contents of either the plurality of data blocks or the first address map. The first address map specifies the location of the plurality of data blocks within the database. During the restore, the plurality of data blocks are copied from the storage medium back to the database and the contents of the plurality of data blocks are analyzed to identify any data specifying an address within the database. The identified data is updated by comparing information from the first address map to a second address map so as to conform pointers within the plurality of data blocks to the arrangement of the data blocks after being copied back to the database. The second address map reflects the arrangement of the plurality of data blocks after being copied from the storage medium to the database.

According to another aspect of the present invention, a method provides for the transfer of a set of data blocks from a first data segment to a second data segment. The method includes copying the set of data blocks from the first data segment to the second data segment without analyzing the contents of the data blocks. Any location dependent information contained in the set of data blocks is updated to conform to the configuration of the second data segment.

According to another aspect of the present invention, a computer system having a processor and a storage medium with a plurality of instructions stored thereon is provided. The execution of the plurality of instructions by the processor causes the processor to copy the plurality of data blocks from a source to a destination without analyzing the contents of the plurality of data blocks. Then, the plurality of data blocks are copied from the destination back to the source. The arrangement of the plurality of data blocks after being copied back to the source constitutes a final configuration. The contents of the plurality of data blocks are analyzed to identify any location dependent information. Any identified location dependent information is updated so that the location dependent information within the plurality of data blocks reflects the final configuration.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing database backup and restore and bulk data transfer is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are illustrated shown in block diagram form in order to avoid unnecessarily obscuring the present invention.

HARDWARE OVERVIEW

Figure 1:
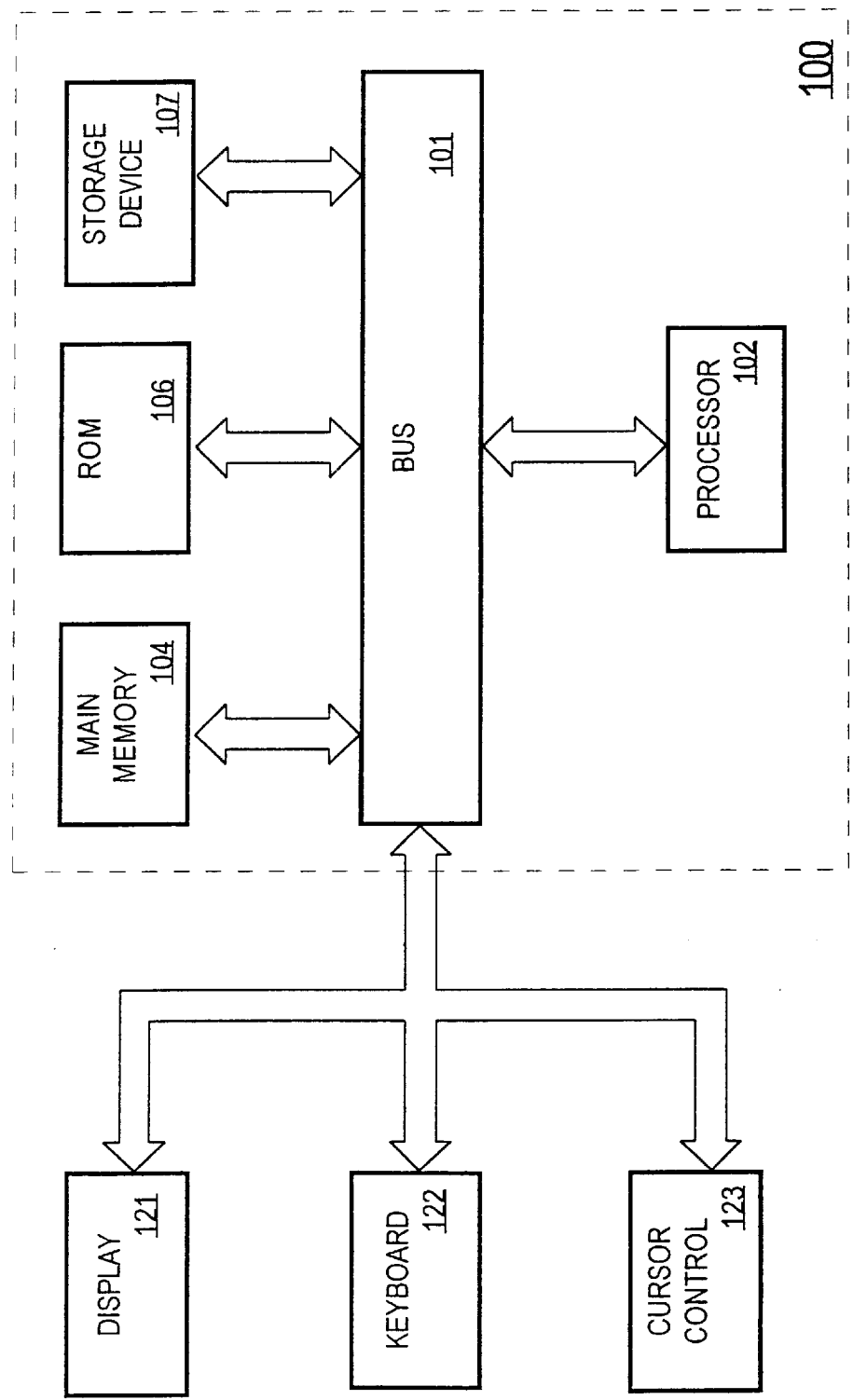
FIG. 1 is a block diagram of a computer system on which the present invention may be implemented.

FIG. 1 illustrates a block diagram of a computer system 100 upon which an embodiment of the present invention may be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also includes a read only memory (ROM) and/or other static storage device 106 coupled to bus 101 for storing static information and instructions for processor 102. A data storage device 107, such as a magnetic disk or optical disk, is coupled to bus 101 for storing information and instructions.

Computer system 100 may also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to provide data backup and restore and bulk data transfer. According to one embodiment, data backup and restore and bulk data transfer is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

The present invention provides for the backup and restoration of data using an approach which provides the flexibility of the logical backup and the favorable performance characteristics of a physical backup.

DATA BACKUP

Figure 2:
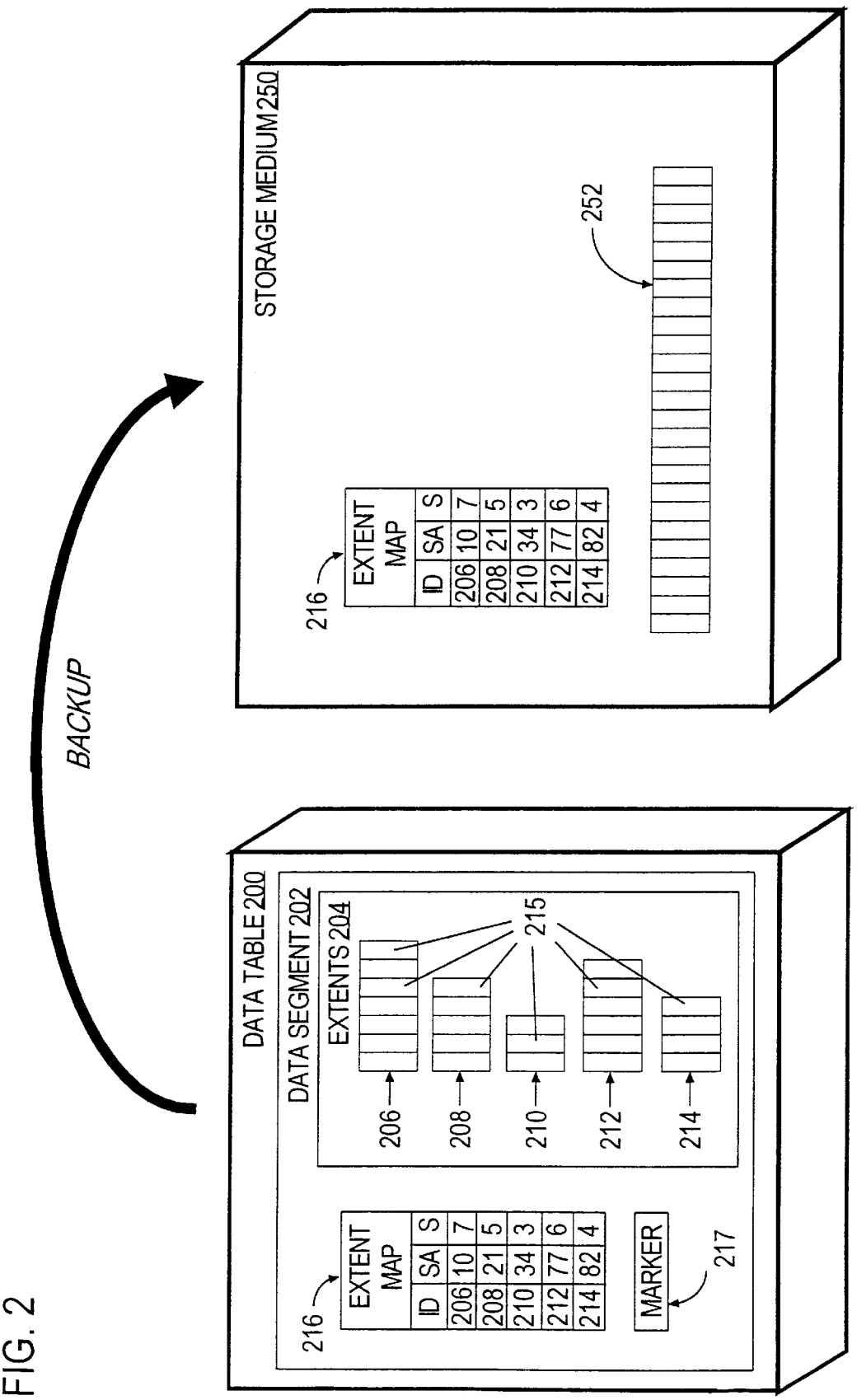
FIG. 2 is a block diagram illustrating the backup of data according to an embodiment of the present invention.

FIG. 2 is a block diagram illustrating the backup of a data segment 202 from a data table 200 to a storage medium 250 according to an embodiment of the present invention. Data segment 202 is a logical storage structure residing on data table 200. Data segment 202 includes a group of extents 204 which includes extents 206, 208, 210, 212 and 214. Each of extents 206, 208, 210, 212 and 214 is a logical storage structure including a specific number of contiguous data blocks 215. Each one of the data blocks 215 corresponds to a specific number of bytes of physical space on disk. The physical space on disk to which each of the data blocks 215 corresponds may contain a variety of data types including location dependent information such as pointers (addresses) to other data blocks 215 within extents 204, or other data segments or data tables (not illustrated). The arrangement of data blocks 215 on data segment 202 constitutes an initial configuration.

According to one aspect of the present invention, additional extents are allocated for data table 200 as more space is required by data table 200. The extents 204 may be different sizes and are not necessarily contiguous with respect to each other. For example, extent 206 includes seven contiguous data blocks 215, while extent 210 includes three contiguous data blocks 215.

Data segment 202 also includes an extent map 216 which identifies the location and size of each extent 206, 208, 210, 212 and 214 so that any extent 204 or data block 215 may be easily located within data segment 202. According to one embodiment of the present invention, extent map 216 includes an identification (ID), starting address (SA) and size (S) for each of the extents 206, 208, 210, 212 and 214.

Data table 200 may contain other data segments and other types of segments, for example index segments, which are not illustrated but to which the present invention is equally applicable.

Storage medium 250 is any volatile or non-volatile storage medium such as memory, disk storage, tape storage or any other type of storage capable of storing the contents of data segment 202.

Backing up data segment 202 from data table 200 to storage medium 250 according to an embodiment of the present invention involves copying data blocks 215 and extent map 216 from data table 200 to storage medium 250 without analyzing the contents of either data blocks 215 or extent map 216. Because no content analysis is performed, an operating system level routine or other copy utility may be used to copy data blocks 215 from data segment 202 on data table 200 to storage medium 250. However, other mechanisms for copying data blocks 215 and extent map 216 which do not analyze or translate the contents of data blocks 215 or extent map 216 may be used without departing from the scope of the present invention.

Once copied to storage medium 250, data blocks 215 are arranged as a group of data blocks 252 having the same relative data block 215 order as when stored in extents 204 on data segment 202. Although the arrangement of data blocks 252 is depicted in FIG. 2 as a single contiguous block, data blocks 252 may be stored in alternative arrangements, including any number of groups of data blocks, each having a different number of data blocks, so long as the original relative data block order or a record thereof is maintained. Maintaining the original data block 215 order allows location dependent information contained in data blocks 215 to be accurately repaired after a restore operation, as is described in greater detail hereafter.

According to another aspect of the present invention, only the data blocks 215 in extents 204 containing meaningful data are copied from data table 200 to storage medium 250 to minimize the amount of data backed up and provide further improved performance. A marker 217 is maintained which identifies the boundary between data blocks 215 that have been allocated and are in use and therefore need to be included in the backup, and those allocated data blocks 215 that have not yet been used. During the copying of data blocks 215 from data table 200 to storage medium 250, marker 217 is used to copy only those allocated data blocks 215 which are in use. Marker 217 may be stored in data segment 202 separate from extent map 216, or maintained as part of extent map 216.

DATA RESTORE

In general, restoring data blocks 252 from storage medium 250 to data table 200 involves (1) copying data blocks 252 from storage medium 250 to data table 200, and (2) correcting location dependent information contained in data blocks 252.

COPYING OF DATA BLOCKS

As with the back-up of data blocks 215 and extent map 216, the copying of the data blocks may be accomplished with an operating system routine or other suitable copy utility. Once data blocks 252 have been copied from storage medium 250 to data table 200, any location dependent information contained in data blocks 252 is corrected based on information contained in extent map 216 to reflect the new configuration of data table 200.

Figure 3:
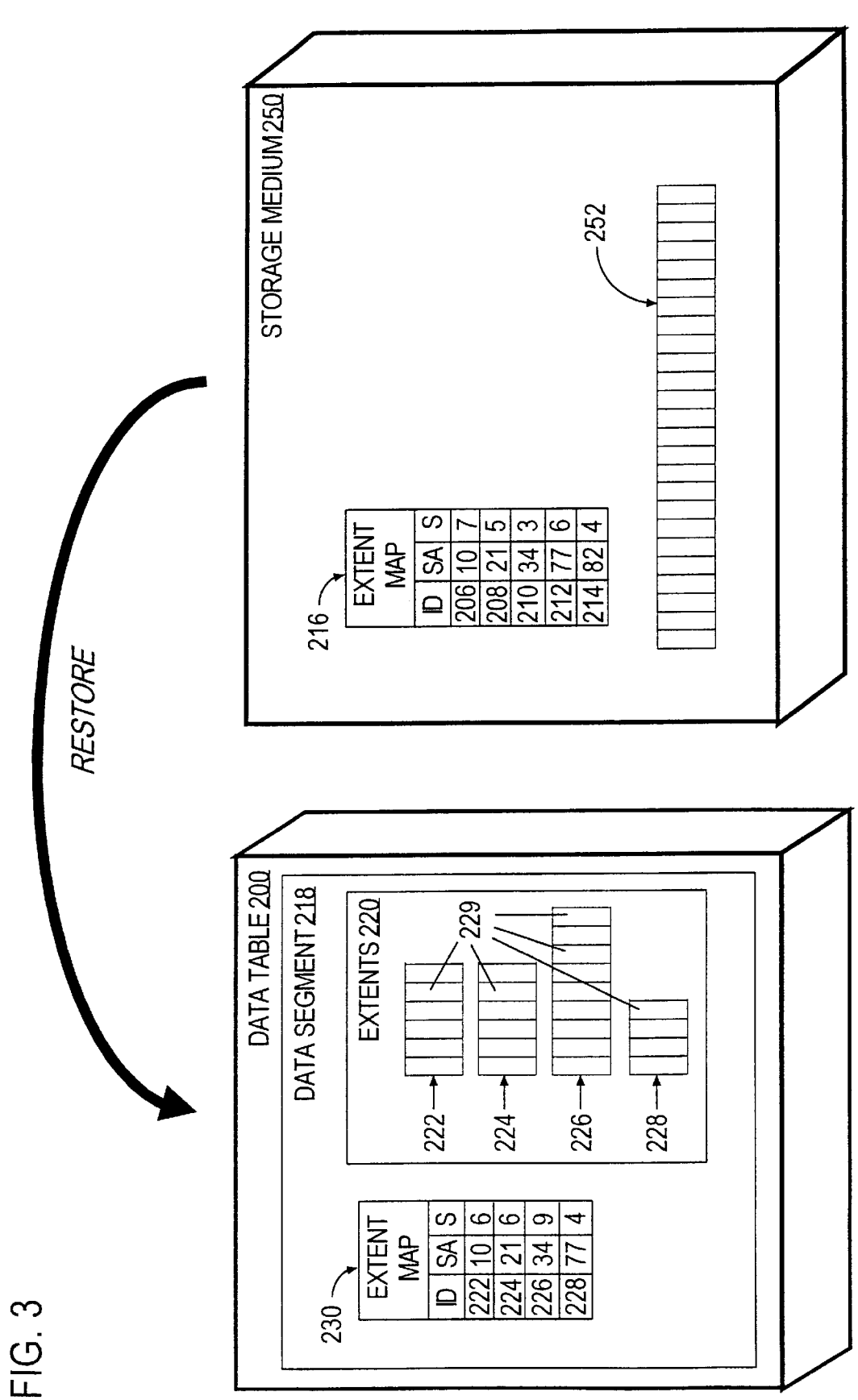
FIG. 3 is a block diagram illustrating the restore of data according to an embodiment of the present invention.

The restoration of data blocks 252 from storage medium 250 to data table 200 is now described in more detail with respect to FIG. 3. Before data blocks 252 are copied from storage medium 250 to data table 200, a new data segment 218 having a group of extents 220 is allocated for data table 200. Extents 220 include four extents, 222, 224, 226 and 228, having a total of twenty five data blocks 229 to store the data contained in data blocks 252. Extents 220 must have at least as many data blocks 229 as data blocks 252. However, extents 220 may have fewer data blocks 229 than extents 204 if some of the data blocks 215 in extents 204 are unused. Also, extents 220 may contain any number of extents, depending upon the allocation of extents when data segment 218 is allocated. An extent map 230 is generated to identify the location and size of each extent 222, 224, 226 and 228.

CORRECTING LOCATION DEPENDENT INFORMATION

Once data blocks 252 have been copied into data segment 218 (as data blocks 229), the contents of each of data blocks 229 are analyzed to identify any location dependent information. All location dependent information is updated to reflect the new arrangement of data blocks 229 on data segment 218.

For example, suppose the first data block of extent 206 (FIG. 2) contains a reference to the first data block of extent 212 (the 16$^{th}$ data block). After data blocks 252 are copied to data segment 218, maintaining the same relative data block 215 order, the first data block of extent 206 is now the first data block of extent 222. More importantly, the reference contained in that data block to the first data block of extent 212 (the 16$^{th}$ data block) is now incorrect in the context of data segment 218 since the reference does not refer to one of the data blocks 229. Therefore, according to an embodiment of the present invention, the reference to the first data block in extent 212 (the 16$^{th}$ data block within the segment) is changed to reference the fourth block of extent 226 (the 16$^{th}$ data block). All other intra-segment information contained in data blocks 229 is updated in the same manner to reflect the arrangement of data blocks 229 within data segment 218. This is easily done since the original extent map 216 was maintained.

The approach for backing up and restoring data according to an embodiment of the present invention has been described with respect to backing up and restoring a single data segment 202. However, the method described is also applicable to the backup and restore of multiple data segments, data tables or any other logical data structure so long as sufficient address information is copied with the data blocks so that location dependent information contained in the data blocks may be updated to reflect the new configuration after the data blocks have been copied.

Figure 4A:
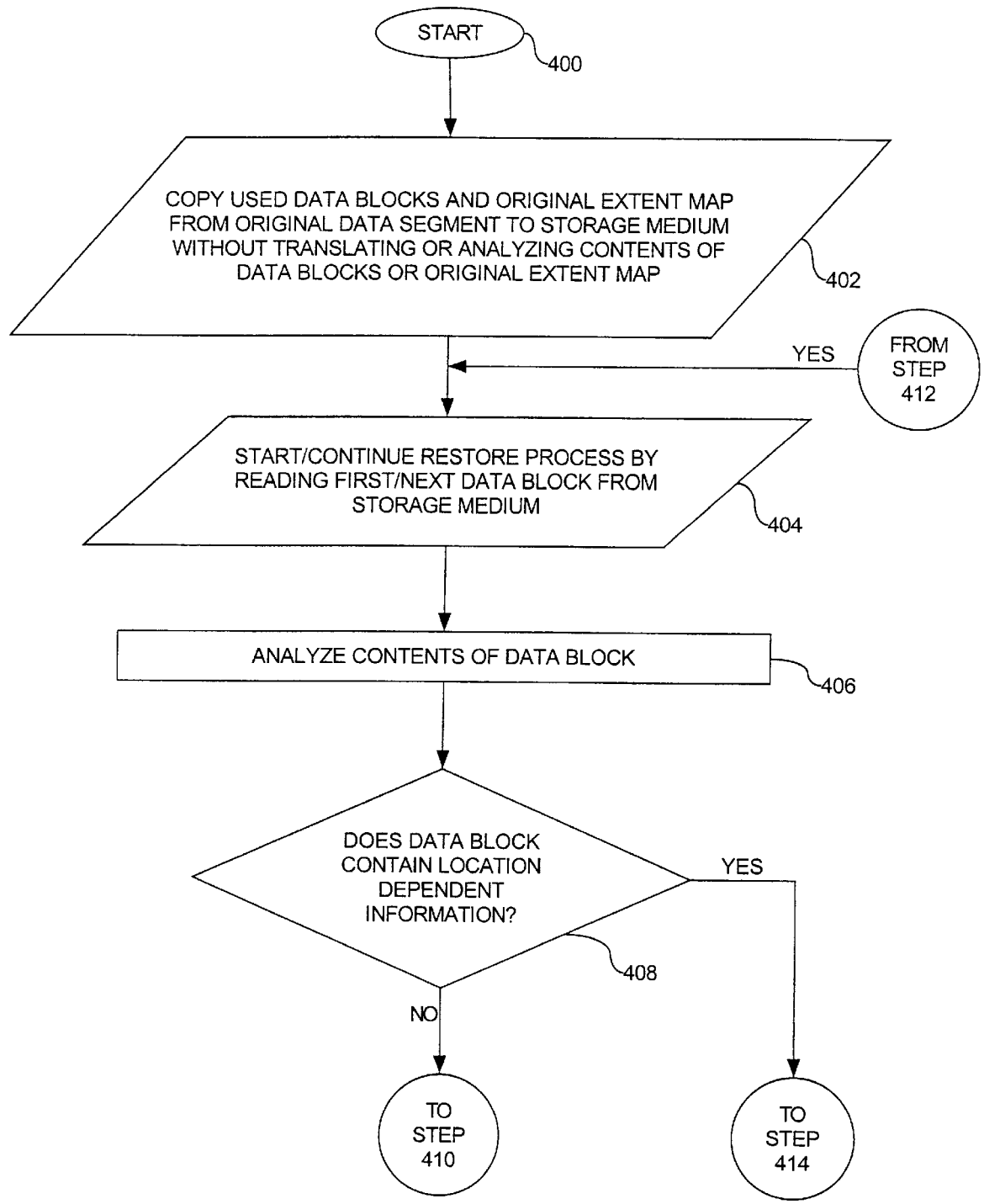
FIGS. 4A and 4B comprise a flow chart illustrating the method of backing up and restoring data according to an embodiment of the present invention.
Figure 4B:
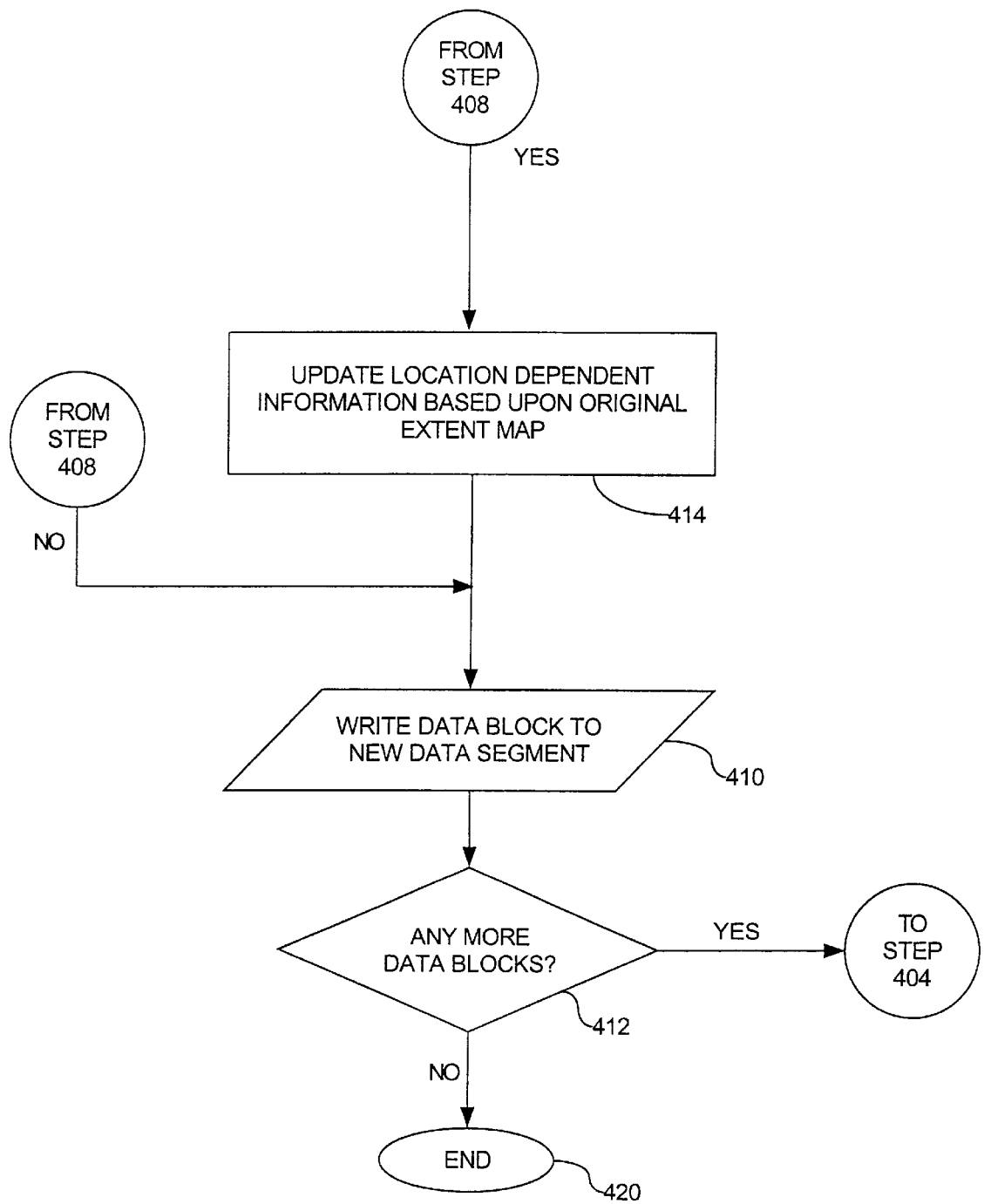

The method of backing up and restoring data according to an embodiment of the present invention is now described with respect to the flow charts illustrated in FIGS. 4A, 4B and the previously described block diagrams of FIGS. 2 and 3. After starting in step 400, in step 402, those data blocks 215 containing meaningful information and extent map 216 are backed up by being copied from data table 200 to storage medium 250 without translating or analyzing the contents of data blocks 215 or extent map 216. In step 404, the restore process is started by reading one of the data blocks 252 from storage medium 250. In step 406 the contents of the data block just read are analyzed and in step 408 a determination made as to whether the contents include any location dependent information. If in step 408, it is determined that the data block does not contain any location dependent information, then in step 410 the data block is written to one of the extents 222, 224, 226, 228 in data segment 218 of data table 200.

After the data block has been written to data table 200 in step 412 a determination is made as to whether any more data blocks 252 need to be restored. If so, then in step 404 another one of the data blocks 252 is read and in step 406 the contents of the data block analyzed. In step 408 a determination is made as to whether this data block contains any location dependent information. If the data block just read does contain location dependent information, then in step 414 the location dependent information is updated to reflect the new data block 229 configuration on data segment 218 by comparing extent map 216 and extent map 230. Then, in step 410, the updated data block is written to data segment 218.

Once, in step 412, it is determined that no more data blocks are to be restored from the group of data blocks 252, then the process is complete in step 420. Although described as a separate step for purposes of explanation, according to one embodiment of the present invention, the updating of the location dependent information is performed during the copy of data blocks 252 from storage medium 250 to data segment 218.

BULK DATA TRANSFERS BETWEEN DATABASES

Although embodiments of the present invention have been described in the context of backing up and restoring a data table, the present invention also provides for the transfer of bulk data between data tables or databases. Unlike the method discussed above which involved backing up data from a data segment to a storage medium and then restoring the data from the storage medium back to the data segment, the transfer of bulk data involves backing up data from a source data segment to a target data segment and then restoring the data on the target data segment.

The process is identical to the process described above, except that the data is copied directly to a segment within a target database rather than to an intermediate backup medium. After the data blocks are copied to the segment within the target database, the contents of the data blocks are analyzed to identify any location dependent information. All location dependent information is updated to reflect the configuration of the second data table as described above. This is achieved by comparing the original extent map associated with the arrangement of the data blocks on the source data segment with the new extent map associated with the arrangement of the data blocks on the destination data segment.

The method and apparatus of the present invention provides several advantages over prior approaches for backing up and restoring data. In particular, the copying of only the data blocks containing meaningful information reduces the amount of data which is included in the backup relative to file based backup techniques. Also, the backup is performed without translating or analyzing the contents of the data blocks or the extent map, reducing backup time relative to logical backup techniques. This is particularly important since in some systems, many backups, sometimes hundreds, are performed between restores. However, when a restore is needed, the flexibility of a logical backup is provided by updating the relevant location dependent information during the restore. As a result, the performance penalty associated with logical backups is avoided until the data needs to be restored.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for backing up and restoring a plurality of data blocks, the method comprising the steps of:

a) copying the plurality of data blocks from a source to a destination without analyzing the contents of the plurality of data blocks, wherein the data blocks are stored on the source according to an initial configuration;

b) copying the plurality of data blocks from the destination back to the source, the arrangement of the data blocks after being copied back to the source constituting a final configuration;

c) analyzing the contents of the plurality of data blocks to identify any location dependent information reflecting the initial configuration; and d) updating any identified location dependent information so that the location independent information reflects the final configuration.

2. The method of claim 1, wherein the step of copying the plurality of data blocks from the source to the destination further comprises the step of copying a first address map associated with the initial configuration from the source to the destination, and wherein the step of updating any identified location dependent information further comprises the step of comparing the first address map with a second address map that reflects the final configuration.

3. The method of claim 1, wherein the step of analyzing the contents of the plurality of data blocks to identify any location dependent information further comprises the step of identifying any information which specifies a location, based on the initial configuration, of data within the plurality of data blocks.

4. The method of claim 1, wherein the step of copying the plurality of data blocks from the source to the destination further comprises the step of only copying those data blocks of the plurality of data blocks which contain useful data as indicated by a marker.

5. The method of claim 4, wherein the step of copying the plurality of data blocks from the source to the destination further comprises the step of copying a first address map associated with the initial configuration from the source to the destination, and wherein the step of updating any identified location dependent information further comprises the step of comparing the first address map with a second address map.

6. The method of claim 1, wherein a) the source is a database, b) the destination is a storage medium, c) the step of copying the plurality of data blocks from the source to the destination further includes the step of copying the plurality of data blocks from the database to the storage medium without analyzing the contents of the plurality of data blocks, and d) the step of analyzing the contents of the plurality of data blocks further includes the step of analyzing the contents of the plurality of data blocks to identify any data specifying an address within the database.

7. The method of claim 6, wherein the step of copying both the plurality of data blocks from the database to the storage medium further comprises the step of only copying data blocks which contain meaningful information as indicated by a marker.

8. The method of claim 6, wherein the step of copying the plurality of data blocks from the database to the storage medium further comprises the step of copying a first address map from the database to the storage medium, the first address map specifying an arrangement of the plurality of data blocks on the database.

9. A computer-readable medium having stored thereon a plurality of sequences of instructions, the plurality of sequences of instructions including sequences of instructions which, when executed by one or more processors, cause the one or more processors to perform the steps of:
  a) copying the plurality of data blocks from a source to a destination without analyzing the contents of the plurality of data blocks, wherein the data blocks are stored on the source according to an initial configuration;
  b) copying the plurality of data blocks from the destination back to the source, the arrangement of the data blocks after being copied back to the source constituting a final configuration;
  c) analyzing the contents of the plurality of data blocks to identify any location dependent information reflecting the initial configuration; and
  d) updating any identified location dependent information so that the location independent information reflects the final configuration.

10. The computer-readable medium of claim 9, wherein the instructions for copying the plurality of data blocks from the source to the destination further include instructions for performing the step of copying a first address map associated with the initial configuration from the source to the destination, and
  wherein the instructions for performing the step of updating any identified location dependent information further include instructions for performing the step of comparing the first address map with a second address map that reflects the final configuration.

11. The computer-readable medium of claim 9, wherein the instructions for performing the step of analyzing the contents of the plurality of data blocks to identify any location dependent information further include instructions for performing the step of identifying any information which specifies a location, based on the initial configuration, of data within the plurality of data blocks.

12. The computer-readable medium of Claim 9, wherein the instructions for performing the step of copying the plurality of data blocks from the source to the destination further include instructions for performing the step of only copying those data blocks of the plurality of data blocks which contain useful data as indicated by a marker.

13. The computer-readable medium of claim 12, wherein the instructions for performing the step of copying the plurality of data blocks from the source to the destination further include instructions for performing the step of copying a first address map associated with the initial configuration from the source to the destination, and
  wherein the instructions for performing the step of updating any identified location dependent information further include instructions for performing the step of comparing the first address map with a second address map.

14. The computer-readable medium of claim 9, wherein the computer-readable medium further includes instructions for specifying that the
  a) the source is a database, and
  b) the destination is a storage medium, and
  wherein the instructions for performing the step of copying the plurality of data blocks from the source to the destination further include instructions for performing the step of copying the plurality of data blocks from the database to the storage medium without analyzing the contents of the plurality of data blocks, and
  wherein the instructions for performing the step of analyzing the contents of the plurality of data blocks further include instructions for performing the step of analyzing the contents of the plurality of data blocks to identify any data specifying an address within the database.

15. The computer-readable medium of claim 14, wherein the instructions for performing the step of copying both the plurality of data blocks from the database to the storage medium further includes instructions for performing the step of only copying data blocks which contain meaningful information as indicated by a marker.

16. The computer-readable medium of claim 14, wherein the instructions for performing the step of copying the plurality of data blocks from the database to the storage medium further include instructions for performing the step of copying a first address map from the database to the storage medium, the first address map specifying an arrangement of the plurality of data blocks on the database.

17. A computer system having a processor and a storage medium with a plurality of instructions stored thereon, the execution of the plurality of instructions by the processor causing the processor to perform the steps of:
  a) copying the plurality of data blocks from a source to a destination without analyzing the contents of the plurality of data blocks, wherein the data blocks are stored on the source according to an initial configuration;
  b) copying the plurality of data blocks from the destination back to the source, the arrangement of the data blocks after being copied back to the source constituting a final configuration;
  c) analyzing the contents of the plurality of data blocks to identify any location dependent information reflecting the initial configuration; and
  d) updating any identified location dependent information so that the location independent information reflects the final configuration.

18. The computer system of claim 17, wherein the instructions for copying the plurality of data blocks from the source to the destination further include instructions which, when executed by the processor, cause the processor to perform the step of copying a first address map associated with the arrangement of the plurality of data blocks on the source from the source to the destination, and
  wherein the instructions for updating any identified location dependent information further include instructions which, when executed by the processor, cause the processor to perform the step of comparing the first address map with a second address map, the second address map being associated with the arrangement of the plurality of data blocks after being copied back to the source.

19. The computer system of claim 17, wherein the instructions for analyzing the contents of the plurality of data blocks to identify any location dependent information further includes instructions which, when executed by the processor, cause the processor to perform the step of identifying any information which specifies a location within a data area on the source where the plurality of data blocks were originally located and
  wherein the instructions for updating any identified location dependent information further includes instructions which, when executed by the processor, cause the processor to perform the step of only updating location dependent information which specifies a location within the data area.

20. The computer system of claim 17, wherein the instructions which when executed by the processor cause the processor to perform the step of copying the plurality of data blocks from the source to the destination further includes instructions which when executed by the processor cause the processor to perform the step of only copying those data blocks within the plurality of data blocks which contain meaningful information as indicated by a marker.

* * * * *